United States Patent [19]

Angelle et al.

[11] 3,835,456

[45] Sept. 10, 1974

[54] COMPRESSION OF THE DYNAMICS OF NUMERICAL SIGNALS

[75] Inventors: Philippe Angelle, Thouare; Jean-Claude Naudot, Nantes, both of France

[73] Assignee: Societe d'Etude, Recherches et Constructions Elecroniques (S.E.R.C.E.L.), Nantes Carquefou, France

[22] Filed: Nov. 5, 1971

[21] Appl. No.: 196,047

[30] Foreign Application Priority Data

Nov. 6, 1970 France .............................. 70.40038

[52] U.S. Cl. .......................... 340/172.5, 340/15.5 DP

[51] Int. Cl. ............................ G01v 1/00, G06f 1/00

[58] Field of Search... 340/172.5, 347 DA, 347 DD, 340/15.5 TD, 15.5 GC, 15.5 DP; 179/15 AV; 178/DIG. 3; 235/154

[56] References Cited

UNITED STATES PATENTS

| | | | |
|---|---|---|---|
| 3,555,540 | 1/1971 | Hartke | 340/347 DA |
| 3,562,504 | 2/1971 | Harris | 235/154 |
| 3,594,560 | 7/1971 | Stanley | 235/154 |
| 3,685,046 | 8/1972 | Howlett | 340/347 DA |

*Primary Examiner*—Raulfe B. Zache
*Attorney, Agent, or Firm*—Breitenfeld & Levine

[57] ABSTRACT

A method and apparatus for reducing the relationship between the maximum and minimum values of amplitude of an analogue or digital signal expressed in fixed point. The method may include displaying an initial value of a factor of compression corresponding to a number of shifts of the point, shifting the point in correspondence with the factor of compression to supply a modified signal, detecting the overflow of a maximum or minimum value by the modified signal, blocking the overflow information for a time corresponding to the maximum or minimum overshoot delay, and modifying the number of shifts of the point in accordance with the detected overflow. The apparatus may include a shift register for receiving a digital signal in fixed point and shifting the signal in correspondence with a factor of compression, a first test circuit which is excited when at least one of a first number of higher orders of notation of the shift register has a logical state other than zero, a second test circuit which is excited when none of a second number of higher orders of notation of the shift register has a logical state other than zero, at least one delay store for producing an output in response to successive excitations of one of the test circuits within a particular delay, another store responsive to the output of the delay store for increasing or decreasing the signal in the shift register depending upon whether the signal is greater than a maximum value or smaller than a minimum value.

12 Claims, 5 Drawing Figures

COMPRESSION OF THE DYNAMICS OF NUMERICAL SIGNALS

The present invention relates to the dynamic compression of digital signals having a large dynamic range, more especially with the aim of realizing an analogue recording of these signals on a support.

It will be remembered that the dynamics of analogue or digital signals is the relationship of the maximum value to the minimum value which the amplitude of the signal is capable of assuming. The term amplitude used in this way corresponds to the peak amplitude of the signal which varies between this amplitude with a positive sign and the same amplitude with a negative sign. The compression of the dynamic range thus corresponds to a reduction of this relationship of the maximum value to the minimum value which the amplitude of a signal can assume.

In order to record a signal of given dynamic range, it is necessary for the recording support to have a maximum signal / noise ratio at least equal to the dynamic range of the signal, when this signal is in analogue form. The expression in digital form of analogue signals allows one to realize therefrom in any case a digital recording while preserving the dynamic range. On the other hand, before effecting an analogue recording of signals having too large a dynamic range, it is necessary to to effect dynamic compression.

The present invention relates to a mode of dynamic compression which is applicable when the items of information carried by signals are of interest essentially on account of the instant when they appear (temporal information), rather than for the amplitude of the signals. Such signals are obtained, for example, upon the study of phenomena of seismic propagation. In this case, measurement pick-ups (Geophones) supply analogue propagation signals which are converted into digital form, or "digitised", by means of an analogue to digital converter. This conversion is accompanied by a sampling of the analogue signals, that is to say that one preserves their digital value only at very close equidistant instants.

For the use of several pick-ups supplying signals relating to one and the same propagation phenomenon, these signals are preferably multiplexed. One digitises successively in time the measurement signals emanating from each of the pick-ups, in a chosen order. This corresponds to a kind of sweeping of the signals emitted by all the pick-ups, this scanning being repeated in a very rapid manner and at very close instants.

The digital seismic signals are recorded on magnetic recorders and one likes to be able to effect a control of the recording at the very localities of this recording. To this end, one effects an anglogue recording (for example on film) of the digital signals read from the magnetic tape of the magnetic recorder. One can examine visually such an anglogue recording and thus control on the terrain the unfolding of the seismic prospecting operations. It is for such a passage from the digital magnetic recording to the analogue recording that it is more often than not necessary to compress the dynamic range of the digital signals of seismic origin.

In all that follows, and in order to simplify the statement, one will envisage the compression of signals of seismic origin, but it has to be understood that the present invention applies in a general manner to the dynamic compression of signals having large dynamic range expressed in digital form, independently of the physical origin of these signals.

The digital signals obtained by anglogue to digital conversion from seismic signals are in certain cases expressed in "fixed point", that is to say by means of a certain number of significant digits, with a decimal point, this point being capable of being moved so as to represent large variations in the amplitude of the signal.

Most of the time, however, these digital signals are expressed with "floating point". Such signals expressed with floating point comprise a mantissa which represents the significant digits, the position of the point being defined a priori in this mantissa, and a characteristic which represents a multiplying factor of these significant digits and which therefore defines the actual position of the point. The big advantage of the expression in floating point appears in an evident manner: the number of significant digits used for the mantissa is constant and the characteristic is reduced to the expression of one power of the base of notation of the mantissa. The characteristic then corresponds to a number of unitary displacements of the point which will be designated hereinafter by the number of shiftings of the point.

Preferably the mode of expression in floating point is chosen such that the characteristic represents shiftings which are all effected in the same direction. In this way, there is no need to use a sign for the characteristic. The sign of the measured signals is generally represented with the mantissa, so as not to be affected by the shiftings. The transformation which allows the passage of the digital signals in floating point to the digital signals in fixed point can in all cases be effected in a known manner by means of a shift register, the basis of notation of the mantissa then being 2. Such a register comprises a certain number of binary positions or bits. In order to make the transformation, one introduces the mantissa into the shift register from a specific position corresponding to the position assigned to the point, and one then effects the number of shiftings represented by the characteristic.

The present invention relates to a method of dynamic compression of digital signals primarily in fixed point, as well as to a device allowing the implementation of this method. When the input signals of this device are expressed in floating point, they are first of all transformed into fixed point as has just been indicated. The invention also relates to a preferred variant of this device, in which there is effected directly the compression of the dynamic range of input signals in floating point.

In accordance with this method, and by means of these devices, output signals in fixed point, of reduced dynamics, are obtained.

More specifically, the method in accordance with the invention comprises generally the following stages:

one sets an initial value of a compression factor of the dynamic range corresponding to a number of shiftings of the point, as well as a maximum overshoot delay and a minimum overshoot delay, on a digital signal in fixed point supplied at a given instant, one effects a certain number of shiftings of the point in correspondence with the compression factor of the dynamic range, which supplies a modified digital signal, one detects the overshoot by a modified digital signal of a maximum value determined by higher values or of a minimum value determined by lower values, this overshoot being able to be effected at a given instant only in a single direction, one blocks this possible overshoot information for a time corresponding to the maximum overshoot delay or to the minimum overshoot delay, depending on whether the overshoot is effected by maximum or minimum values, if such overshoot information persists for all the digital signals supplied during the corresponding delay, one modifies the number of shiftings expressed by the compression factor by one unit towards the higher or lower values according to whether the detected overshoot happens through lower or higher values respectively, which tends to bring the modified digital signals of the following instants back into the dynamic range represented by the said maximum or minimum values.

The devices in accordance with the invention for the implementation of this method comprise generally:

a dynamic compression shift register for receiving digital input signals in fixed point, and shifting these signals in correspondence with a compression factor, first test circuit in relation to a maximum value of the digital signals, connected to a first number of higher orders of notation of the said shift register, the said first test circuit being excited when the logical state of the said shift register in at least one of these orders of notation is different from 0;

a second circuit connected to a second number of higher orders of notation of the said shift register, this second number being greater than the said first number, the said second test circuit being excited when none of the associated orders of notation has a logical state different from 0, at least one delay store capable of counting during a chosen delay a number of successive excitations of one of the two test circuits, the said delay being different according to whether the excitation occurs for the first test circuit or the second test circuit, and the said store having at least one output excited when the successive excitations of one of the test circuits occur in an uninterrupted manner during the delay associated with the said test circuit, a store of a dynamic compression factor, connected to the output of the said delay store, and whose content is modified by one increment in order to obtain, when the said output is activated, a growth or a diminution of the signal contained in the shift register according to whether this signal is less than the minimum value or greater than the maximum value, the said store being connected to the shift register in order to effect in this register a shift corresponding to the said factor of compression.

In a special embodiment, and for digital input signals expressed in floating point, the device comprises furthermore an auxiliary shift register in which the signals in floating point are transformed into signals in fixed point.

In a preferred variant of embodiment, and for digital input signals expressed in floating point, the device comprises a single shift register in place of the dynamic compression shift register and of the auxiliary shift register, as well as an algebraic adder capable of receiving the characteristic of the digital signals in floating point, and the dynamic compression factor in order to add them algebraically, the result of this addition being a number of shifts applied to the said sole shift register.

In accordance with another feature of the invention, the device comprises furthermore a circuit for initiating the dynamic compression.

In a first embodiment for seismic uses, this initialisation circuit comprises a threshold circuit, and is arranged in order to annul authoritatively the output signal as long as the input signal has not exceeded the said threshold, which allows one to avoid amplifying weak digital signals representing noise.

In a second embodiment, even better adapted to seismic experiments, in the case of a dynamic compression device of the dynamics for signals multiplexed according to a plurality of channels, a predetermined instant of start of the dynamic compression of the dynamics is assigned for each channel, as from an impulsional signal TB defining the instant of triggering of a seismic shock, after an interval of time to for one of the channels and according to an arithmetical progression of the intervals of time for the other channels.

Further features and advantages of the invention will emerge when reading the following description, made with reference to the attached drawings, given by way of non-restrictive examples, and in which.

The device shown in FIG. 1 will now be described. This device receives a plurality of input lines SNE of the digital signals in floating point, which emanate for example from a reading system of a digital recorder (not shown). These signals comprise, as has been said previously, a characteristic, which is a coded digital representation of an amplification factor or gain, and a mantissa which is a representation of the significant digits. Preferably, these two codings are identical, and use the binary notation. The characteristic then corresponds to a number of unitary shifts of the point as from a predetermined position of the point in the mantissa. As has already been said, this predetermined position is chosen so that the shifts always occur in the same direction.

Figure 1:
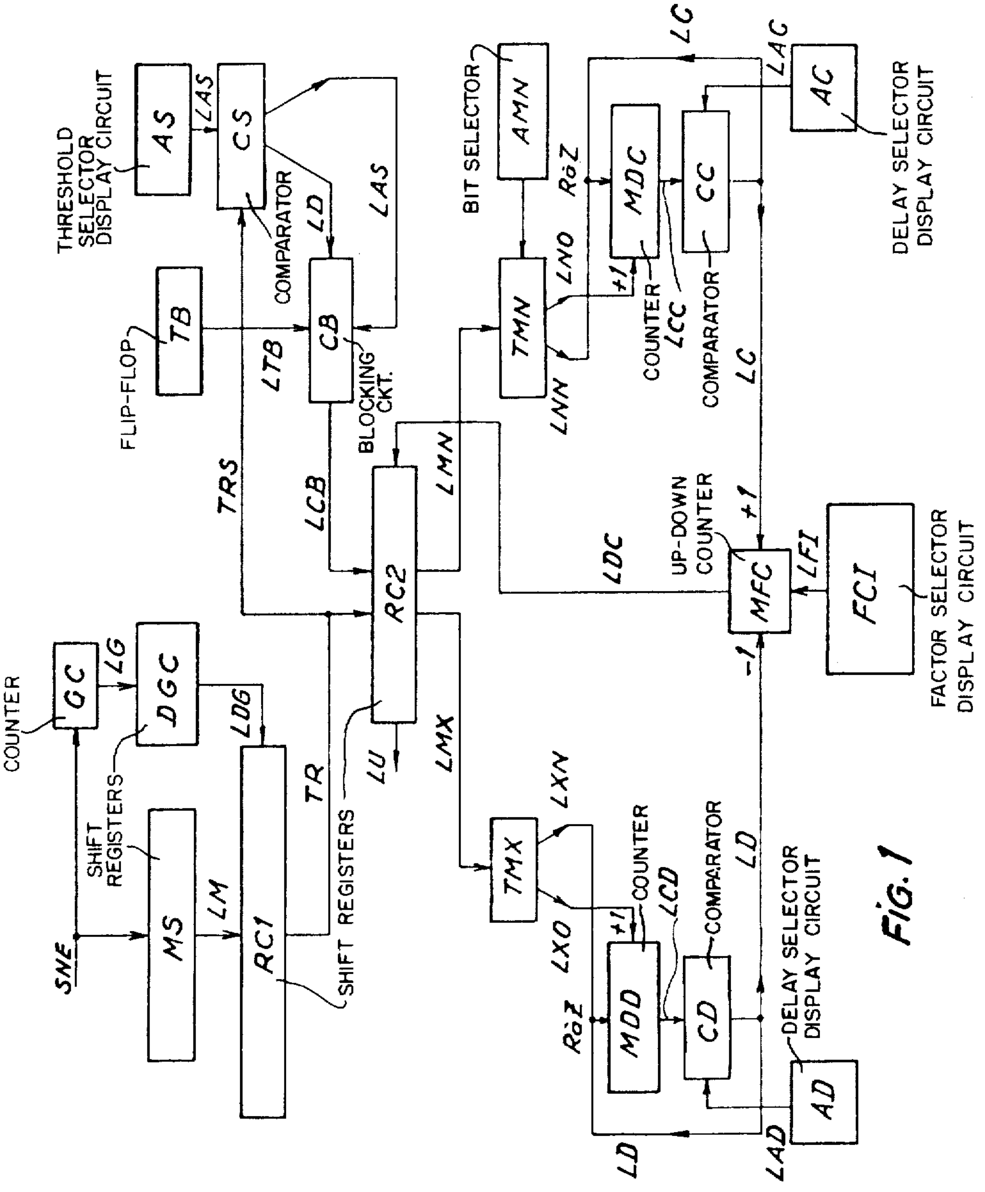
FIG. 1 shows a dynamic compression device for digital signals in "floating point", in which there are effected separately the transformation of the signals into "fixed point" and the dynamic compression with a threshold initialisation circuit.

In FIG. 1, the whole of the lines SNE is connected on the one hand to a stage MS which receives the digital signals of the mantissa and on the other hand to a stage GC which receives the coded digital signals of the characteristic. The stage GC is connected by lines LG to a decoding stage DGC, constituted by a shift register of low capacity, in which the coded digital signals of the characteristic are transformed into a number of shifts.

The stage MS is connected to a shift register RC1 by means of a plurality of lines LM, which are connected to a number of bits of the shift register determined according to the number of significant digits of the mantissa. This shift register RC1 receives from the stage DGC by a line LDG the number of shifts which it is necessary to apply to the mantissa in order to obtain a signal in fixed point.

As has been said further above, this number of shifts is effected as from a predetermined position in the mantissa. Preferably, this predetermined position is chosen so that one introduces the significant digits of the mantissa into the higher order bits of the shift register RC1, and the shifts represented by the characteristic are always effected towards the lower order bits.

When there has been effected on the mantissa the shifts represented by the characteristic, an operation which is conventionally called multiplication, the shift register RC1 contains a certain number of logical states representative of the input signal expressed in fixed point. The other logical states of this shift register are zero states.

The whole of the logical states of the shift register RC1 is then transferred by means of a plurality of lines TR into a shift register RC2 which comprises the same number of bits. This shift register RC2 comprises a plurality of utilization lines LU capable of transferring the various logical states representative of the digital signal which it contains.

It also comprises two outputs, connected respectively to lines LMX and LMN, which are activated respectively when the digital signal contained in the shift register RC2 is greater than a given maximum value or less than a given minimum value, these two states not being able to occur simultaneously.

To this end, the lines LMX and LMN are connected to a certain number of higher order bits of the shift register RC2, the line LMN being connected to a greater number of bits than the line LMX.

The lines LMX are connected to a test circuit TMX defining the maximum value. This maximum value is a function of the number of logical states of the shift register, which are transmitted by the lines LMX, as from the higher orders of bits and towards the lower orders of bits. The circuit TMX is sensitive to the pressure of at least one logical state different from zero amongst those which are transmitted to it by the lines LMX. When there exists such a logical state different from zero, transmitted by the lines LMX, the output line LXO of the circuit TMX is activated. When no logical state is different from zero, the output line LXN of the circuit TMX is activated.

In a similar manner the lines LMN are connected to a test circuit TMN defining the minimum value. This circuit TMN is sensitive to the fact that all the logical states transmitted through the lines LMN are zero logical states. As has been said further above, the lines LMN represent, as from the logical state of the higher order bits of the shift register RC2, a certain number of logical states of bits, this number being obligatorily greater than that which is transmitted by the lines LMX.

In addition, the circuit TMN is connected to a display circuit defining the minimum value AMN. (Herein a display circuit is a circuit which allows, by manual intervention, the choice of a value amongst a certain number of possible values for a magnitude). This display circuit AMN allows one to make the test circuit TMN insensitive to a certain number of logical states as from the logical state corresponding to the lowest order of bits, amongst those which are transmitted by the lines LMN.

The circuit TMN is therefore sensitive to the fact that all the logical states supplied by the lines LMN, taking into consideration the display of the circuit AMN, are zero states. When this condition is realized, the output line LNO of the circuit TMN is activated. In the contrary case, it is the output LNN which is activated.

It is necessary to note that the test circuit TMX can also be provided with a display circuit similar to the display circuit AMN.

According to the value of the digital signal in fixed point present in the shift register RC2, three states are therefore possible for the output lines of the two test circuits:

the said signal is greater than the maximum value: the lines LXO and LNN are then activated, the said signal is comprised between the minimum value and the maximum value; the lines LXN and LNN are then activated, the said signal is lower than the minimum value displayed by the circuit AMN, in which case the lines LXN and LNO are activated.

Among the four lines LXO, LXN, LNO and LNN, those whose final letter is N correspond to a correct value of the signal in fixed point present in the shift register RC2 with regard to the corresponding test value. Those whose final letter is O correspond to an exceeding of the said test value. This overshoot obviously cannot occur simultaneously through lower and higher values. Accordingly, the lines LXO and LNO cannot be activated simultaneously.

The lines LXO and LNO which, when one of them is activated, correspond respectively to the overshoot detected by the test circuit TMX (maximum value) and by the test circuit TMN (minimum value), lead respectively to stores MDD and MDC.

The store MDD is a counter which realizes the diminution delay; it counts the number of successive digital signals which gives rise to an overshoot by maximum values. This store of the diminution delay MDD is connected by a line LCD to a comparator CD of the diminution delay, which compares the content of the store MDD to a value displayed by means of a display circuit AD of the diminution delay. To this end, the delay selector display circuit AD is connected to the comparator CD by a line LAD. The comparator CD has an output connected to a line LD which is activated when the diminution delay recorded in the store MDD is greater than its value displayed by the display circuit AD.

This line LD is connected to a dynamic compression factor store circuit MFC, which will be described later on. It is, on the other hand, connected to an input for reset to zero of the store MDD which also receives the line LXN. It is evident that the activation of the lines LXN and LD is however independent.

The minimum value test assembly is realized in the same manner. The output line LNO of the test circuit TMN is connected to an increase delay store MDC, whose content it increases by one unit whenever it is activated, that is to say for each successive overshoot of the minimum value towards the lower values detected for the digital signal contained in the shift register RC2. This store MDC is connected by a line LCC to an increase delay comparator CC, which also receives from a display circuit AC a value chosen for this increase delay. To this end, the delay selector display circuit AC is connected by the line LAC to the comparator CC. The output of the comparator CC, connected to a line LC, is activated when the content of the store MDC is greater than the delay set in the circuit AC.

This line LC is connected to the dynamic compression store circuit MFC which will be described hereinafter. The line LC is on the other hand connected to an input for reset to zero of the store MDC, which also receives the line LNN. Of course the activation of the lines LNN and LC occurs in an independent manner.

There will now be described the dynamic compression adjustment assembly. This assembly comprises the store circuit MFC already mentioned which has an input connected to the line LD, an input connected to the line LC, and, an input connected by a line LFI to a display circuit FCI for the initial value of the dynamic compression factor. The store MFC has finally an output connected by a line LDC to the register RC2.

When the digital signal contained in the form of logical states in the shift register RC2, after the shift effected according to the dynamic compression factor, supplied by the store MFC, is comprised between the aforesaid maximum and minimum values, the lines LD and LC are not activated. The said compression factor is, then, not modified.

On the other hand, when during a time equal to the diminution delay, the signal contained in the shift register RC2 has proved to exceed constantly the maximum value, the line LD is activated which diminishes by one increment the content of the store MFC. Simultaneously, the store MDD is reset to zero. A new overshoot of the maximum value therefore takes effect on the compression factor only if it persists during a time equal to the diminution duration.

In a similar manner, when during a time equal to the increase delay, the said signal contained in the shift register RC2, after the application of the shift corresponding to the dynamic compression factor, remains lower than the minimum value during a time equal to the increase delay, the line LC is activated which increases by one increment the content of the store MFC. Simultaneously, the store MDC is reset to zero. A new overshoot by lower values of the minimum value therefore takes effect on the compression factor only if it persists during a time equal to the increase delay.

If the modification of the dynamic factor compression were effected without delay, the resulting dynamic range would be equal to the relationship of the maximum and minimum values. There would result therefrom, however, large distortions of the input signal. With such delays, upon the increase and upon the diminution, the dynamic range obtained is greater than this relationship, and as will be seen later on, the dynamic compression of the signals is accompanied by reduced distortions of amplitude as a function of time, whilst the temporal items of information which it conveys are better preserved.

It is necessary to note that the circuit MFC which processes the dynamic compression factor is similar to the circuits GC and DGC which treat the characteristic representative of the amplification factor. In fact, these circuits MFC do not contain, properly speaking, a dynamic compression, but a coded digital representation of this dynamic compression factor of compression, the coded digital representation being identical to that which allows the passage of the characteristic to the amplification factor.

It is also necessary to note that all the operations effected in the device which has just been described are made independently of the sign of the digital signals. The result is that the values displayed in the various display circuits are valid both for the positive signals and for the negative signals.

FIG. 1 also comprises initialisation circuits which are adapted to seismic uses. It is known that the instant of triggering of a seismic shock or "time break" (TB) is defined by an impulse, and that the reception of the seismic signal commences with a maximum amplitude a certain time after this instant of triggering. It is preferable to block the operation of the dynamic compression device for as long as the signals of strong amplitude have not arrived in order to avoid a considerable amplification of noises of no interest. To this end, represented in FIG. 1 is a circuit TB which commands through a line LTB the implementation of a blocking circuit CB as soon as the aforesaid instant of triggering TB has appeared. A threshold selector display circuit AS is capable of defining a threshold below which the signals received do not form the subject of dynamic compression. This display circuit AS is connected by a line LAS to a comparator CS which also receives through a line TRS the digital signal in "fixed point" contained in the shift register RC1. When the content of this register remains less than the set value, the output line LD of the comparator CS orders the blocking circuit to maintain the blocking, that is to say the reset to zero of the shift register RC2 without there intervening the compression factor available on the line LDC. When the content of the register RC1 becomes greater than the threshold set by the circuit AS the output line LAS of the comparator CS gives the order to the blocking circuit CB to permit the dynamic compression in the shift register RC2. The blocking circuit CB is connected, to this end, by a line LCB to a zero reset input of the shift register RC2.

There will now be given one example of digital values for the realization of a device as shown in FIG. 1. The dynamic range of the seismic signals is of the order of 120 dB. These seismic signals are expressed preferably by means of a mantissa having 14 significant binary digits, and of a characteristic which can have from 0 to 7 shifts of two binary positions each, in other words in binary notation 000 to 111 shifts. This characteristic comprises 3 binary digits. The shift register DGC is therefore a register comprising three binary positions. The shift register RC1 which regenerates in fixed point the digital signal comprises in all $14+7\times 2 = 28$ binary positions. The mantissa is introduced into the 14 higher orders of notation of this register, and it forms the subject of a number of shifts supplied by the characteristic decoded in the circuit DGC. All the binary positions of the shift register RC1 are transmitted into the shift register RC2 which therefore comprises 28 binary positions or bits.

The display of the initial value of the dynamic compression factor in the circuit FCI depends on the order of magnitude of the input signals. The capacity of the store MFC is deduced therefrom in number of binary positions.

As regards the aforesaid maximum and minimum values, they are chosen equal respectively to half and one-eighth or one-sixteenth of the full scale of the shift register RC2. The line LMX which corresponds to the maximum value is therefore connected, to this end, to the binary position corresponding to the higher order bit, and the test circuit TMX is sensitive to the fact that this binary position is in the logical state 1. The line LMN is connected to the three or four binary positions corresponding to the three or four higher order bits, according to whether the minimum value is one-eighth or one-sixteenth. In fact, if one considers a binary shift register as from the higher order bit, a 0 in this higher binary position indicates that the content of the register is less than half the full scale, and three or four 0 in the three or four higher binary positions indicate that the content of the register is less than one-eighth or one-sixteenth respectively of this full scale. The display circuit AMN acts on the test circuit TMN in order to regulate the minimum value either to one-eighth or to one-sixteenth.

It stands to reason that the threshold comparator CS which receives an item of information on the signal contained in the shift register RC1 can in fact be connected only to some bits of the shift register RC1, these bits being chosen according to the various values of the threshold displayed on the display circuit AS.

It is observed that the device shown in FIG. 1 has two shift registers of large capacity (28 bits in the example quoted), which effect operations going in the opposite direction. The applicant has perfected a preferred variant of the device of FIG. 1, in which one uses a single shift register of lower capacity, the multiplying factor (in the form of a characteristic) and the compression factor (in identical form) forming the subject of an algebraic addition before being applied to this shift register. (It will be recalled that the characteristics are logarithmic expressions, and that their algebraic addition corresponds to a multiplication or to a division of the associated factors). This preferred variant realized by the applicant is the device shown in FIG. 2.

Figure 2:
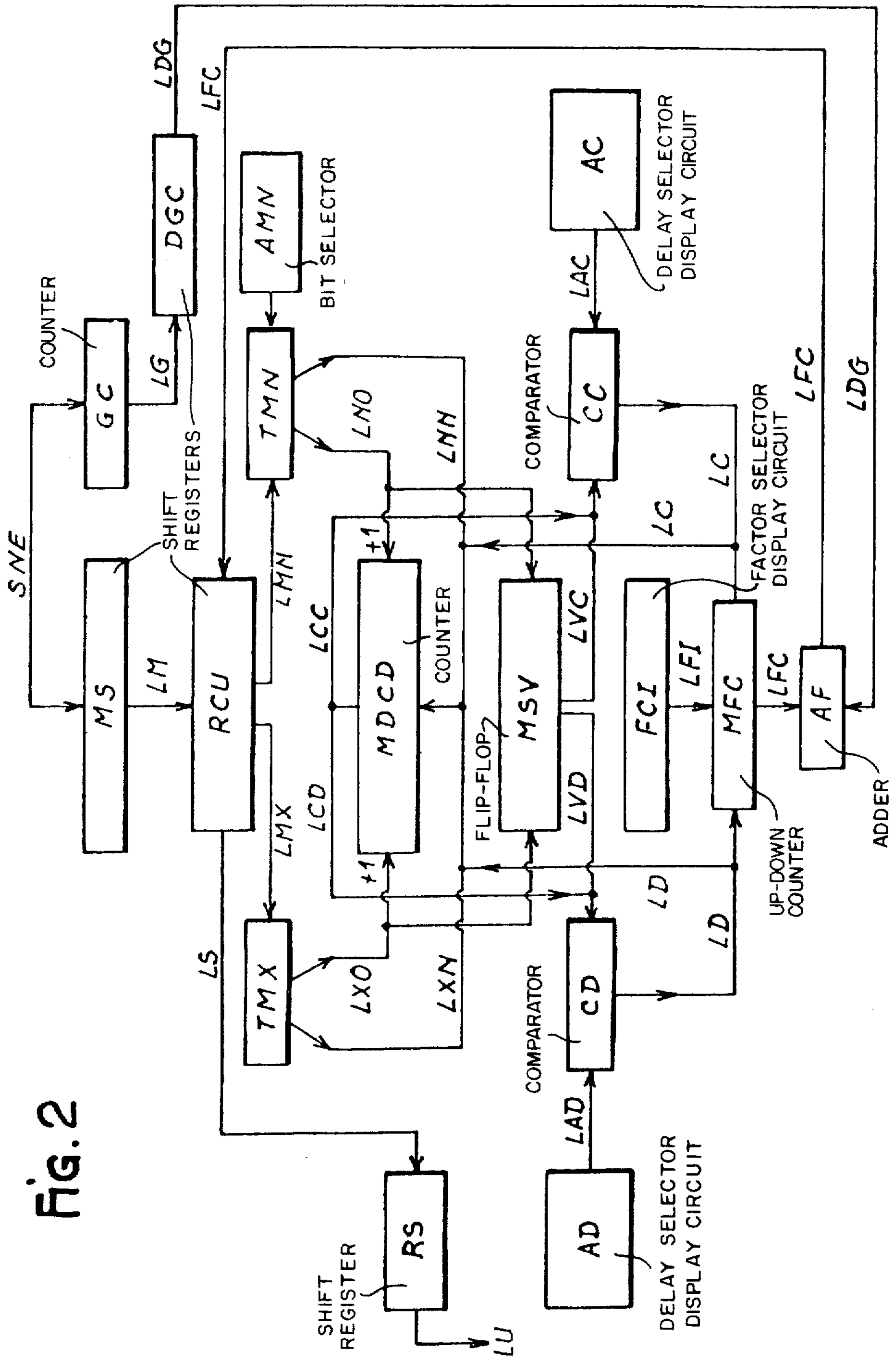
FIG. 2 shows a dynamic compression device for digital signals in "floating point", in which the transformation into "fixed point" and the dynamic compression are effected by means of a single shift register.

The elements of FIG. 2 which are identical to the elements of FIG. 1 bear the same references. One thus finds there again the input lines SNE, connected to the stages MS and GC, which receive respectively the mantissa and the characteristic. The stage GC is connected by a line LG to a decoding stage DGC. The mantissa is transmitted from the stage MS to a single shift register RCU by a plurality of lines LM.

It is known that the maximum dynamic range of an anglogue recording is 40 to 50 dB. The result is that a signal in fixed point destined for such a recording necessitates at the most seven or eight binary positions. Since the two shifts associated with the multiplying factor (characteristic) and with the factor of compression are made in the opposite direction, the fourteen significant bits of the mantissa are amply sufficient, and the register RCU is advantageously limited to a capacity of 14 bits or binary positions. This single shift register RCU has an output line LS connected to an output register RS which itself supplies on a line LU the output signals of the dynamic compression device.

One finds again also in FIG. 2, the line LMX and LMN which transmits the logical state of a certain number of higher binary positions of the shift register RCU, in the same manner as in the case of FIG. 1. These lines LMX and LMN are connected respectively to test circuits TMX and TMN, which each have two output lines LXO, LXN, LNO and LNN; the test circuit TMN receives the minimum value of the display circuit AMN.

One finds again also the display circuit AD of the diminution delay connected by a line LAD to a diminution delay comparator CD, as well as the increase delay display circuit AC connected by an increase delay line LAC to a comparator CC. The respective output lines LD and LC of the comparators CD and CC correspond respectively, when they are activated to a diminution or to an increase in the content of a compression factor store MFC. This store receives an initial value of factor from a display circuit FCI through the medium of a line LFI. The store MFC is connected by a plurality of lines LFC to an algebraic adder AF which also receives through a line LDG the content of the decoding stage DGC of the characteristic. The output of this algebraic adder AF is transmitted via a line LFC to effect in the shift register RC1 a shift corresponding to the result of this algebraic addition.

It has been remarked previously that the increase delay and the diminution delay stores never function simultaneously. The device shown in FIG. 2 is therefore provided with an increase-diminution delay store MDCD, whose content can be augmented by one unit either by activation of the line LXO, or by activation of the line LNO. The content of this store MDCD is available on two lines of outputs LCD and LCC connected respectively to the comparators CD and CC. This store MDCD can be reset to zero by one of the lines LXN and LNN, only in the case where they are activated simultaneously, or else by one of the lines LD or LC, which are connected, to this end, to the store MDCD.

The lines LXO and LNO, when one of them is activated, are capable of changing the state of a direction of variation store (a flip-flop) MSV to two states. This store has two outputs connected respectively to lines LVD and LVC which, according to the direction of the variations, cause the content of the delay store MDCD, in combination with th lines LCD and LCC, to act on the comparator CD or the comparator CC respectively.

One thus finds once more an operation identical to that of the device shown in FIG. 1. However, the device of FIG. 2 is simpler, and effects the compression of the dynamics more rapidly, notably by virtue of the reduced number of shifts which occur.

Figure 3:
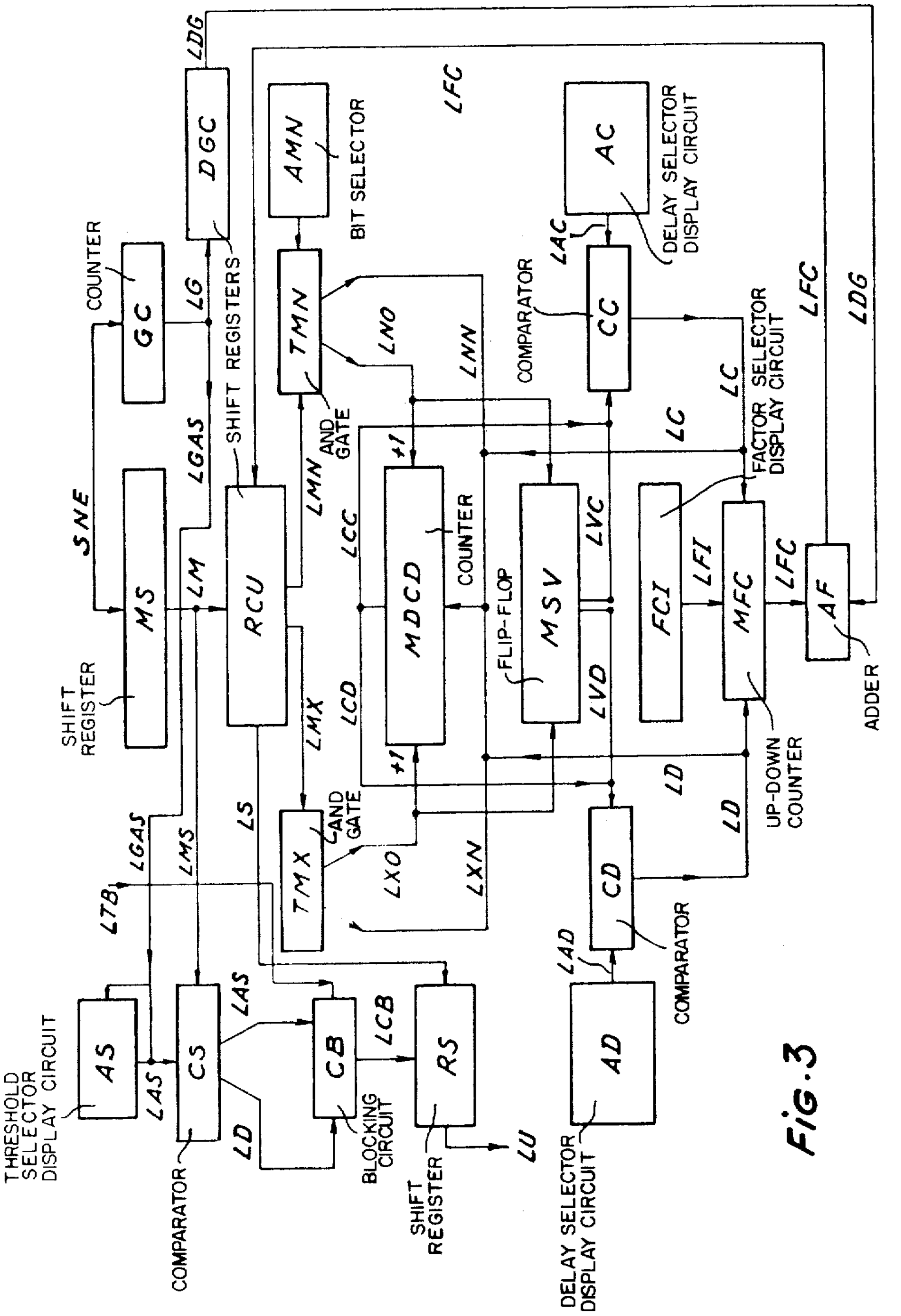
FIG. 3 shows the device for dynamic compression of the digital signals "in floating point" of FIG. 2 with the addition of a threshold initialisation circuit.

The device of FIG. 3 has, in addition to that of FIG. 2, an initialisation assembly of the compression of the dynamics, identical to that of FIG. 1, save in two particulars. In fact, the digital input signal is not available in fixed point. One therefore sends the content of the stage GC through a line IGAS which modifies the display AS according to the multiplying factor of the mantissa. This mantissa is transmitted from the stage MS towards the comparator CS by means of a line IMS. The comparator CS therefore effects the comparison of the mantissa to the value of the threshold multiplied by the multiplying factor contained in the stage GC. Finally, the action of the blocking circuit CB corresponds to a reset to zero effected directly on the output register RS via a line LCB.

In the first embodiment, with threshold, of an initialisation circuit, the initial conditions for the compression of the dynamics are defined by a blocking at zero of the output signal of the dynamic compression device so long as the input signal of this device has not exceeded a preregulated threshold value. A predetermined initial compression factor is used at the start of the dynamic compression.

This arrangement allows one to avoid a strong amplification of the noise, which is as a rule alone present before the arrival of the signals on which there is made the dynamic compression.

However, a momentary noise signal of high amplitude can trigger prematurely the operation of the circuit for dynamic compression, which has the effect of introducing a very low compression factor, therefore a very high factor of amplification, when the noise becomes normal once more. This renders unusable the start of the useful signals, these latter then being affected by too high an amplification which leads to saturation and can be reduced only at the end of a certain time.

In the case of a multiplexed installation having a plurality of channels respectively connected to each of the geophones, it is necessary to provide just as many end of blocking stores at zero as there are channels. All the channels pass through the same dynamic compression device, and the delay, of compression factor and, possibly direction of variation stores, are equal in number to that of the channels and suitable switched over in a synchronous manner relatively to the multiplexing.

In a second embodiment of initialisation circuits, the initial conditions are supplied by a circuit inhibiting the functioning of the first and second test circuits until a predetermined instant, which has the effect of maintaining the dynamic compression factor at a constant value until this instant.

In such an embodiment for multiplexed signals according to a plurality of channels, particularly adapted for the seismic signals, a predetermined instant of start of the dynamic compression is assigned for each channel, as from the impulsional signal TB defining the instant of triggering of a seismic shock, after an interval of time to for one of the channels and according to an arithmetical progression of the intervals of time for the other channels.

Figure 4:
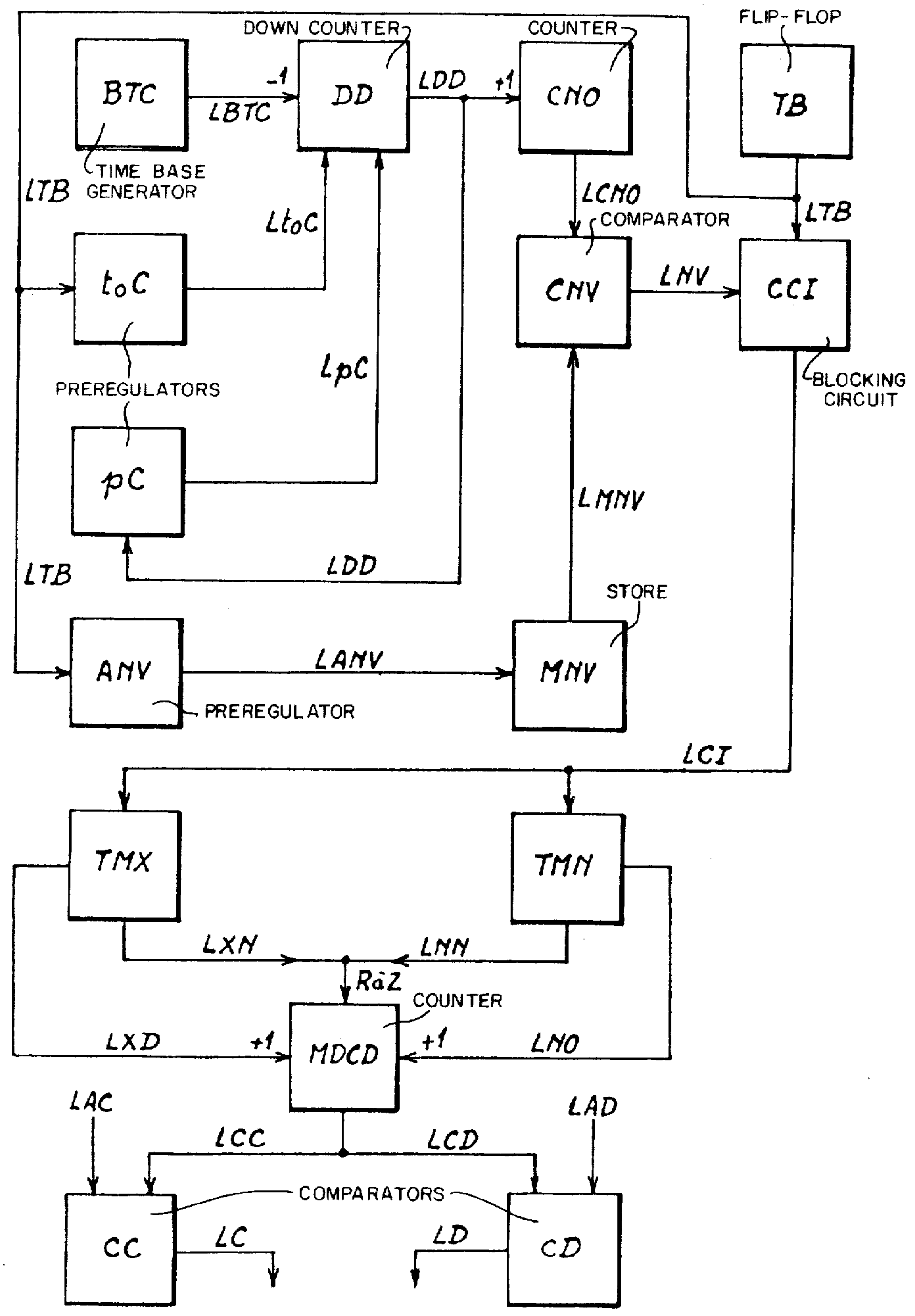
FIG. 4 shows an initialisation circuit in accordance with the second embodiment, with the device of FIG. 2, partially shown.

FIG. 4 comprises in its lower portion the circuits of tests TMX and TMN, respectively with regard to the maximum value and to the minimum value. These two circuits can on the one hand reset to zero the increase-diminution delay store MDCD, when the lines LXN and LNN are activated simultaneously. In the contrary case, one of the circuits TNX or TNN increments the content of the store MDCD, by one unit for each numerical sample, the multiplexing being taken into consideration.

The content of this store is transmitted on lines LCC and LCD, respectively to delay comparators for increase CC, and for diminution CD. These comparators receive preregulated reference values, respectively on the lines LAC and LAD. Finally, they command respectively an increase and a diminution of the dynamic compression factor through the lines LC or LD.

The circuits of tests TMX and TMN comprise an inhibition input functioning in such a manner that an inhibition signal present on this input prevents any activation of their output lines, that is to say of the lines LXO, LXN, LNO and LNN. In this way no delay can be recorded in the store MDCD, and the compression factor remains at a constant value, which is for the device shown in FIG. 2, that supplied by the circuit FCI for the display of the initial value of this factor of compression.

The inhibition signal of circuits of tests TMX and TMN, is supplied on a line LCI by an inhibition command circuit CCI (FIG. 4), in response to signals which will now be described in detail, essentially within the framework of seismic applications, this assembly being called the inhibition circuit.

It is known that, in a general manner, pick-ups or geophones which perceive a plurality of seismic electrical signals are aligned in an equidistant manner, at a certain distance from the firing point where seismic shocks are generated. These seismic signals form the subject of a multiplexed digital recording, and a main aim of the dynamic compression circuits proposed is to allow a control or a play-back in the form of anglogue signals of these multiplexed digital signals after recording.

In the second embodiment of initialization circuit, the dynamic compression commences with a delay to with regard to the aforesaid impulse TB for one or two of the multiplexing channels, and it commences with delays increasing according to an arithmetical progression of ratio *p* for the other channels, in correspondence with the disposition on the terrain of the geophones connected to the different channels.

Among the dispositions currently used on the terrain, there is known the "direct end firing" and the "inverse end firing" where one of the geophones is nearest to the firing point, and the others arranged in an equidistant manner on a straight line passing through this geophone, while drawing away from the firing point. The difference between these two modes of firing results from the order of the numbering of the geophones: in the first case, the first said geophone bears the first number, in the second case it bears the final number. There is also known the firing at the centre, where two geophones bearing median numbers are arranged substantially at an equal distance from the firing point, and where the other geophones are aligned in an equidistant manner on either side of these two median geophones, drawing away from the firing point.

Represented in FIG. 4 is a one bit memory cell or flip-flop circuit TB, charged with memorizing the arrival of the impulse TB (time break) corresponding to the instant when the firing is effected. A display circuit of the numbers of channels ANV, previously regulated by an operator is rendered effective by the memorization of the impulse TB, via the line LTB, in order to introduce into a plurality of stores MNV, in (*a*) number equal to that of the multiplexing channels, the respective numbers of channels assigned to the said channels, through the medium of lines LANV.

The diagram of FIG. 4 also comprises a generating circuit of numbers of order. This circuit comprises a time base BTC, supplying signals at a repetitive cadence, which can be chosen for example equal to 2 milliseconds. This time base serves to supply a scale of time as from the impulse TB for the start of the compression of the dynamics on the different channels, as will now be seen. The output of the time base BTC is connected by a line LBTC to a deductor DD of the delays at the start of the dynamic compression on the different channels. This deductor comprises two forcing inputs, one of which is connected by a line LtoC to a preregulating circuit of the aforesaid delay *to*, which circuit is designated by the reference *to*C. This circuit is preregulated by the operator and activated once only at the start of the presence of a signal on the line LTB, that is to say upon the arrival of the impulse TB. The other input, which acts of course in the same manner as the first one on the stages of the deductor DD, is connected by a line LpC to a preregulating circuit *p*C for the value of the aforesaid ratio *p*, the circuit *p*C being activated to force the deductor to the value *p* at each activation of the output of the deductor DD, which indicates that this latter is at the value zero.

The output of the deductor DD is transmitted on the line LDD to an order number counter CNO, whose counting value augments by one unit whenever the output of the deductor DD indicates that this latter is at the value zero.

A comparator CNV is connected by lines LCNO to the output of the order of number counter CNO, and by lines LMNV subjected to that of the stores of numbers of channels MNV which corresponds to the channel in course of processing. This comparator CNV supplies an output signal on a line LMV when the counting of the counter CNO is equal to that of the store MNV of the channel in course of processing. In this case, the inhibition command circuit CCI, which had been activated by the line LTB at the moment of the arrival of the impulse TB, sees its operation interrupted, and the dynamic compression commences for the channel in course of processing.

The dynamic compression factor therefore remains constant and equal to the value given by the circuit FCI of FIG. 2 until the dynamic compression commences as has just been indicated. A store having one bit for each channel (not shown) records the fact that the dynamic compression has commenced, and has to be continued later on.

In this way, the channel bearing the first order number forms the subject in the first instance of a dynamic compression after an interval of time to which is a multiple of the period of time base DTC; the dynamic compression then commences for the other channels in the order of the numbers assigned to the channels with delays which increase after this interval of time *to* according to an arithmetical progression of ratio *p*, also preregulated in the form of a multiple of the period of the time base PTC. It stands to reason that channels can bear the same channel number, more especially in the case of the firing at the centre.

The values of *to* and of *p* are advantageously regulated in such a way that the dynamic compression commences slightly after the arrival of the first seismic signals on each channel, and the initial compression factor is regulated in such a way that before the start of the dynamic compression, the noise does not appear, while the seismic signals are correctly transmitted towards the output of the dynamic compression circuit (register RS of FIG. 2).

The circuits of FIG. 4 have the advantages that the dynamic compression cannot be triggered prematurely by a high noise, and hand that the signals present before the start of the dynamic compression are available with the regulated initial compression factor instead of seeing themselves assigned arbitrarily value zero.

Figure 5:
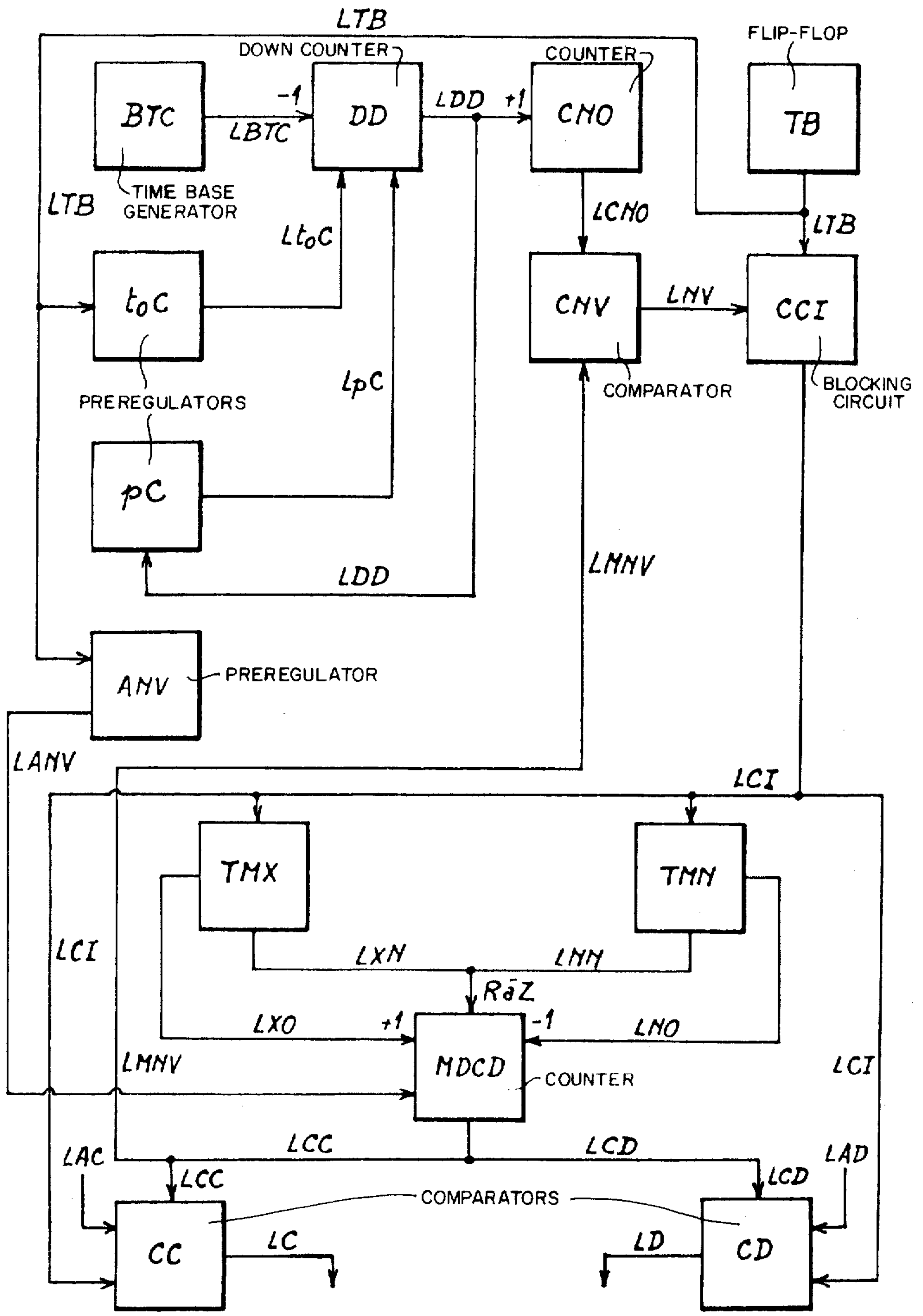
FIG. 5 shows a preferred variant of the circuit of FIG. 4.

FIG. 5 shows a variant of the circuits of FIG. 4 in which the store MDCD of each multiplexing channel is used to store the corresponding channel number preregulated by the circuit ANV. The output of each store MDCD is then connected, via a multiplexing commutator (not shown), to the comprator CNV. The stores MDCD do not contain any delay before the start of the dynamic compression, and can therefore be used as stores of numbers of channels. Since the fact that the dynamic compression has commenced on one channel is stored, there is no disadvantage in the order number of each channel being effaced (by the test circuits) at the start of the dynamic compression. It will be observed however that the initial compression factor has to be chosen by the operator in such a way that each store MDCD is reset to zero at the start of the dynamic compression. To rid oneself of this necessity, it is preferable to reseto to zero in a systematic manner each store MDCD at the start of the dynamic compression on the corresponding channel.

In addition, since the channel number contained in the stores MDCD can be higher than the delays assigned for the increase or the diminution of the compression factor, and the content of the store of the direction of variation MSV can indicate either the increase, or the diminution, it is necessary for the output signal of the circuit CCI to be also transmitted to the comprator CC and CD *to* inhibit any activation of the lines LC and LD so long as the test circuits are inhibited.

With the exception of that which has just been described, the circuits of FIG. 5 are the same as those of FIG. 4.

For its application calling in digital seismic signals in floating point, the applicant has obtained very satisfactory results by regulating the increased delay of the compression factor for a time between once and ten times the pseudo-period of the oscillations which form the propagation signal. The increase delay is chosen of the order of the period of the components of low frequency of the seismic signal. The displayed initial value of the compression factor, as well as the minimum test value are chosen as a function of the local conditions of seismic experimentation. As has been said earlier, one obtains by means of a device in accordance with the invention digital seismic signals of reduced dynamic range in which there is present a rather low distortion of amplitude while the temporal items of information are very easily exploitable, on the localities of experimentation.

These signals are converted into analogue then recorded on a recording support. They are then immediately usable on the recording localities. In this case, the dynamic compression is effected preferably from recorded digital signals, which allows a control or "playback" of this latter recording.

The devices described are capable of processing digital signals obtained after sampling of analogue signals. The method in accordance with the invention also applies to digital signals obtained in the case where a multiplexing is also effected. In the case as described above, the circuits sensitive to specific variations of the digital signals of each channel are used at the rate of one per channel, and they are commuted in correspondence with the multiplexing. These circuits are the delay stores, the store of the compression factor, as well as for the device of FIG. 2, the store of the direction of variation.

Finally, although the present invention has been described with reference to propagation signals, as well as with digital values particularly adapted to seismic experimentations, it is easy for a man of the art to extend it to the dynamic compression of the digital signals of any origin which bear temporal items of information by suitably adjusting the various values of display.

What is claimed is:

1. A method of processing digital signals in fixed decimal point, representing successive samples of an analog signal, to compress the dynamic range associated with the represented analog signal, comprising the machine steps of:

storing a chosen integer representative of a dynamic compression factor, shifting each digital signal with respect to its decimal point according to a predetermined multiple of said integer, to obtain a modified digital signal, comparing said modified digital signal with predetermined first and second digital values, the first digital value being higher than the second digital value, counting a first count of successively adjacent digital signals which are greater than said first digital value and a second count of successively adjacent digital signals which are less than said second digital value, and altering the integer by minus one when the first count is equal to or equal to a whole number multiple of, a first delay counter or by plus one when the second count is equal to, or equal to a whole number multiple of a second delay count, whereby the modified digital signals successively represent an analog signal substantially within the dynamic range corresponding to the first and second digital values.

2. An electronic device for processing digital signals in fixed decimal point, representing successive samples of an analog signal, to compress the dynamic range associated with the represented analog signal, comprising:

a store for an integer representing a compression factor, means for presetting the store to contain a chosen integer, a shift register for successively receiving said digital signals in fixed point, means for shifting the digital signal within the shift register according to a predetermined multiple of said integer, comparator means for subsequently comparing the shifted digital signal with a first digital value and with a second digital value which is less than the first digital value, counting means responsive to said comparator means for counting a first count of adjacent successive digital signals greater than said first digital value, and a second count of adjacent successive digital signals less than said second digital value, and means responsive to said counting means for altering the integer in said store by minus one when the first count is equal to or equal to a whole number multiple of, a first delay count and by plus one when the second count is equal to or equal to a whole number multiple of a second delay count.

3. A device in accordance with claim 1, for processing digital signals in floating decimal point, having a characteristic and a mantissa, wherein the shift register receives the mantissa, and the shifting means receives the characteristic for shifting the digital signal according to the algebraic sum of said predetermined multiple of the integer and said characteristic.

4. A device in accordance with claim 3, wherein the comparator means comprises a first test circuit responsive to a first number of most significant bits of said shift register for energizing a first output of the comparator means when one of said bits is not zero, and a second test circuit responsive to a second number of most significant bits of said shift register for energizing a second output of the comparator means when all of said bits are zero, said second number of most significant bits being higher than the first one.

5. A device in accordance with claim 4, wherein at least one of the first and second numbers is adjustable.

6. A device in accordance with claim 4, wherein said counting means includes a bistable store having first and second states for recording which one of the first and second outputs of the comparator circuit is being energized, respectively, a delaying store responsive to the bistable store for being reset to zero whenever the state thereof changes, and connected to both first and second outputs of the comparator circuits for counting the number of last-occurred adjacent successive energizations of one of them, first and second coincidence digital comparators, both coupled to the delaying store for receiving the count therein and to the bistable store for being alternatively enabled depending upon the first and second states thereof, respectively, and means for supplying the coincidence comparators with respective first and second delay reference values, one of said first and second comparators having its output energized when the content of the delaying store equals its respective delay reference value, and wherein said means responsive to the counting means are coupled to the first and second outputs of the coincidence comparators therein and responds also thereto for resetting to zero the delaying store when any one of the first and second outputs of the comparator circuits is energized.

7. A device in accordance with claim 4, wherein said counter means includes a first delaying store connected to the first output of the comparator circuit for counting the number of last occured adjacent successive energizations thereof, a second delaying store connected to the second output of the comparator circuit for counting the number of last occurred adjacent successive energizations thereof, a second delaying store connected to the second output of the comparator circuit for counting the number of last occurred adjacent successive energizations thereof, first and second coincidence digital comparators, coupled to the first and second delaying store for receiving the counts therein respectively, and means for supplying the first and second coincidence comparators with respective first and second delay reference values, one of said first and second comparators having its output energized when the content of the delaying store equals its respective delay reference value, and wherein said means responsive to the counting means are coupled to the first and second outputs of the coincidence comparators and responds also to energization of the first or second inputs for resetting to zero the first or second delaying store, respectively.

8. A device in accordance with claim 2, comprising initilization means coupled to the shift register, and responsive thereto for inhibiting the operation of the device so long as the digital signal has not exceeded a determined value.

9. A device in accordance with claim 3 comprising initilization means for forcing de-energization of the first and second outputs of the comparator means until a predetermined instant, whereby the integer is maintained at its chosen value until the predetermined.

10. A device in accordance with claim 9, in which the digital signals are multiplexed from a plurality of channels, wherein the initialization means comprises a store for each of these channels, means for presetting a channel number for each channel in the corresponding store, a generator circuit of successive serial numbers at predetermined instants, a coincidence digital comparator of each successive serial number from said generating circuit with the channel number contained in the store corresponding to the channel of which the digital signal is being processed, and wherein the initialization means operates selectively on the digital signals from each channel so long as the said comparator has not detected an equality in a channel.

11. A device in accordance with claim 10, characterized wherein the generator circuit of successive serial numbers comprises a time base; a down-counter having a clock input connected to the time base and a forcing input for supplying an output signal whenever its count is at zero; first forcing means for initially forcing the said deductor to a first chosen value; second forcing means responsive to each output signal of the down counter for forcing the down counter to a second chosen value; and another counter coupled to the output of the down counter for counting the output signals thereof as a count of serial number.

12. A playback system for checking records of digital signals in floating point representing analog signals having a large dynamic range, comprising a device in accordance with claim 3, a digital to analog converter for converting the modified digital signal and means for recording the analog signal from said digital to analog converter.

* * * * *